United States Patent
Pmsvvsv et al.

(10) Patent No.: US 11,387,476 B2
(45) Date of Patent: Jul. 12, 2022

(54) FAULT TOLERANT ELECTRICAL ARCHITECTURE FOR FUEL CELL SYSTEMS

(71) Applicant: BLOOM ENERGY CORPORATION, San Jose, CA (US)

(72) Inventors: Prasad Pmsvvsv, Sunnyvale, CA (US); Craig Metcho, Philadelphia, PA (US); Beau Baker, Sunnyvale, CA (US); Amit Bhattacharjee, Newark, DE (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/176,894

(22) Filed: Feb. 16, 2021

(65) Prior Publication Data

US 2021/0257638 A1 Aug. 19, 2021

Related U.S. Application Data

(60) Provisional application No. 62/978,646, filed on Feb. 19, 2020.

(51) Int. Cl.
*H01M 8/04* (2016.01)
*H01M 8/04858* (2016.01)
(Continued)

(52) U.S. Cl.
CPC ... *H01M 8/04947* (2013.01); *H01M 8/04225* (2016.02); *H02J 3/381* (2013.01); *H01M 2250/10* (2013.01); *H02J 2300/30* (2020.01)

(58) Field of Classification Search
CPC .......... H01M 8/0494; H01M 8/04225; H01M 8/04947; H01M 2250/10; H02J 3/381
See application file for complete search history.

(56) References Cited

U.S. PATENT DOCUMENTS

2012/0267952 A1* 10/2012 Ballatine ................. H02J 3/387
307/26
2014/0009003 A1 1/2014 Ballantine et al.
(Continued)

FOREIGN PATENT DOCUMENTS

KR 10-2018-0128849 A 12/2018
WO WO2017/044196 A1 3/2017

OTHER PUBLICATIONS

Notification of Transmittal of the International Search Report and the Written Opinion of the International Searching Authority for International Patent Application No. PCTUS2021/018150, dated Jun. 9, 2021, 8 pages.

(Continued)

*Primary Examiner* — Olatunji A Godo
(74) *Attorney, Agent, or Firm* — The Marbury Law Group PLLC

(57) ABSTRACT

During a steady-state mode of operating a fuel cell system, a system power is generated by fuel cells and is provided via a steady-state bus to a first BOP load, to a second BOP load, and to a power grid via a transformer and via at least one of a bi-directional first inverter or a bi-directional second inverter. During startup mode operation of the fuel cell system, external power from the power grid is provided via the transformer, via one of the first or second inverters and via a startup bus to the first BOP load and the second BOP load.

20 Claims, 6 Drawing Sheets

(51) Int. Cl.
*H01M 8/04225* (2016.01)
*H02J 3/38* (2006.01)

(56) References Cited

U.S. PATENT DOCUMENTS

| | | |
|---|---|---|
| 2015/0288220 A1 | 10/2015 | Gurunathan et al. |
| 2016/0036236 A1 | 2/2016 | Teichmann |
| 2017/0005480 A1 | 1/2017 | Ballantine et al. |
| 2017/0338502 A1 | 11/2017 | Pmsvvsv et al. |
| 2019/0052094 A1 | 2/2019 | Pmsvvsv et al. |
| 2019/0229535 A1 | 7/2019 | Pmsvvsv et al. |
| 2019/0245216 A1 | 8/2019 | Liao et al. |
| 2019/0312432 A1 | 10/2019 | Gurunathan et al. |
| 2019/0312441 A1 | 10/2019 | Ballantine et al. |
| 2020/0020964 A1 | 1/2020 | Pmsvvsv et al. |
| 2020/0076200 A1 | 3/2020 | Ballantine et al. |
| 2020/0212459 A1 | 7/2020 | Ballantine et al. |
| 2020/0266658 A1 | 8/2020 | Cottuli et al. |

OTHER PUBLICATIONS

U.S. Appl. No. 17/098,797, filed Nov. 16, 2020, Bloom Energy Corporation.
U.S. Appl. No. 63/026,222, filed May 18, 2020, Pmsvvsv et al.

\* cited by examiner

FAULT TOLERANT ELECTRICAL ARCHITECTURE FOR FUEL CELL SYSTEMS

FIELD

The present disclosure is directed to power electronics in general and to a fault tolerant electrical architecture for fuel cell power generation systems in particular.

BACKGROUND

Current fuel cell systems may consume power during startup, due to the time needed to reach operating temperatures at which fuel cells generate power. This power is typically generated by converting the utility AC voltage to a DC voltage that is usable by converters powering the fuel cell balance of plant (BOP) components and other parasitic loads. Conventionally, this conversion requires extra components such as transformers, rectifiers, fuses, and wiring that are not utilized during steady-state operation, which may represent the majority of a systems life cycle. As such, there is a need for better component utilization, in order to reduce system costs.

SUMMARY

According to an embodiment, a fuel cell system comprises an inverter module and a power module. The inverter modules comprises a transformer electrically connected to an external power source bus which is configured to be connected to an external power source, bidirectional first and second inverters electrically connected to the transformer, a fault diode electrically connected to the first inverter; and a first balance of plant (BOP) load. The power module comprises fuel cells and a second BOP load. A steady-state bus electrically connects the first and second inverters to the first BOP load, the second BOP load, and the fuel cells, and a startup bus electrically connects the first and second inverters to the first BOP load and the second BOP load. During a steady-state mode operation of the system, system power is generated by the fuel cells and is provided to the first BOP load, the second BOP load, and at least one of the first inverter and the second inverter, via the steady-state bus. During a startup mode operation of the system, external power from the external power source bus is provided to the first BOP load and the second BOP load, via one of the first or second inverters and via the startup bus.

According to another embodiment, a method of operating a fuel cell system includes, during steady-state mode operation of the system, generating system power by fuel cells and providing the system power via a steady-state bus to a first balance of plant (BOP) load, to a second BOP load, and to a power grid via a transformer and via at least one of a bi-directional first inverter or a bi-directional second inverter, and during startup mode operation of the system, providing external power from the power grid via the transformer, via one of the first or second inverters and via a startup bus to the first BOP load and the second BOP load.

BRIEF DESCRIPTION OF THE DRAWINGS

The accompanying drawings, which are incorporated herein and constitute part of this specification, illustrate examples of the disclosed devices and methods, and together with the general description given above and the detailed description given below, serve to explain the features of the invention.

DETAILED DESCRIPTION

The various examples will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. It is also understood that the examples shown in the figures are not mutually exclusive. Features shown in one example (e.g., in one figure) may be included in other examples (e.g., in other figures).

Fuel cell power generation systems, such as solid oxide fuel cell (SOFC) based distributed power generation systems, may have relatively high operating temperatures, such as temperatures of 750° C. and above for SOFCs, during a steady-state power generation mode. Accordingly, during system startup, such systems are generally provided with power from an external source, such as a connected utility or other external AC generator, in order to power balance of plant (BOP) elements (e.g., fans, blowers, switches, etc.) and/or parasitic loads. This external startup power may be provided by converting the externally provided AC voltage to a DC voltage that is usable by the converters powering the BOP elements and other parasitic loads.

Figure 1A:
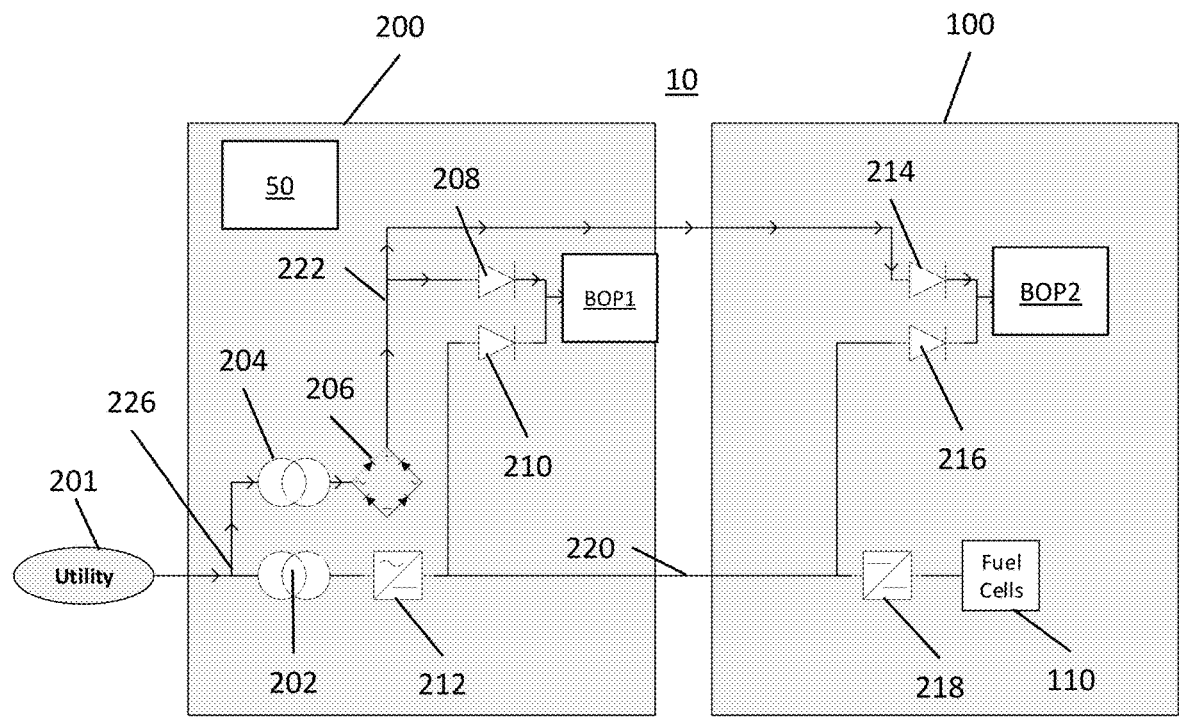
FIG. 1A is a schematic illustrating power flow through electrical architecture of a fuel cell system during system startup.
Figure 1B:
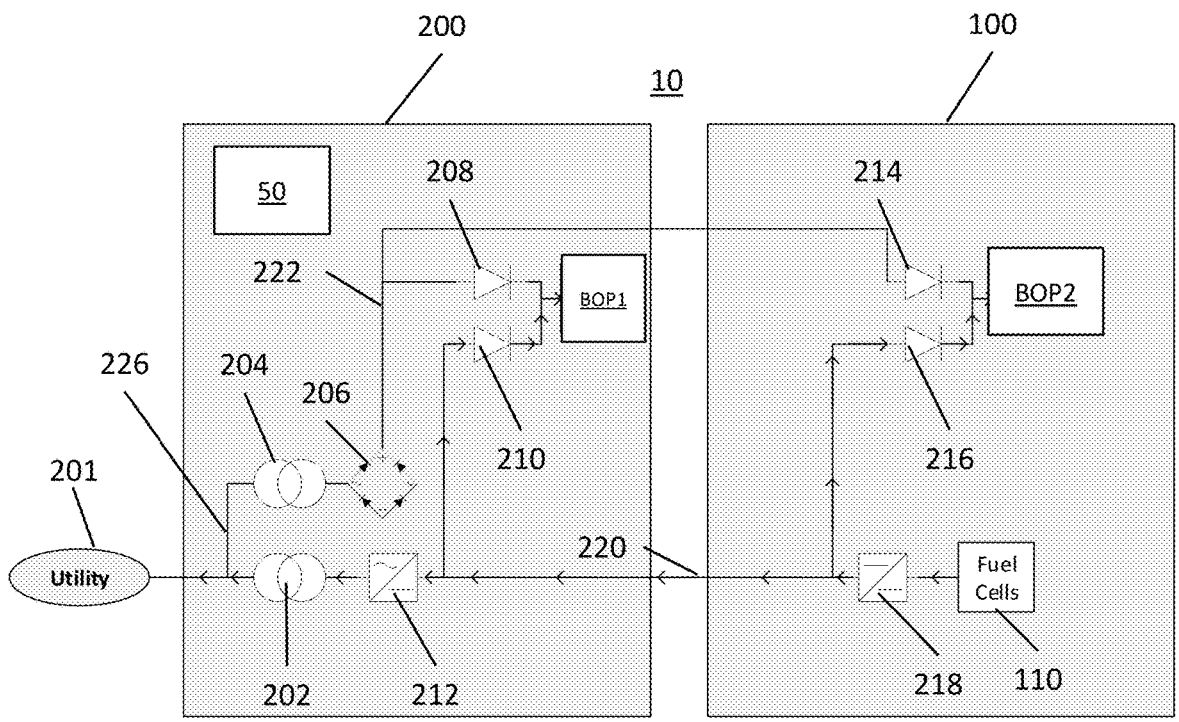
FIG. 1B is a schematic illustrating power flow through the fuel cell system electrical architecture during steady-state operation, according to a comparative embodiment of the present disclosure.

FIG. 1A is a schematic illustrating power flow through electrical architecture of a fuel cell system 10 during system startup, and FIG. 1B is a schematic illustrating power flow through the fuel cell system electrical architecture during steady-state operation, according to a comparative example of the present disclosure. As would be apparent to one of ordinary skill in the art, the component "connections" described below are intended to refer to "electrical connections" unless otherwise specified.

Referring to FIGS. 1A and 1B, the system 10 may include an inverter module 200 and at least one power module 100 including fuel cells 110. The fuel cells 110 may be arranged in one or more stacks or columns. The fuel cells 110 may include solid oxide fuel cells having a ceramic oxide electrolyte separated by conductive interconnect plates. Other fuel cell types, such as proton exchange membrane (PEM), molten carbonate, phosphoric acid, etc. may be used. The power module 100 may be connected to the inverter module 200 by a startup bus and a fuel cell (e.g., steady state) bus, as described below. In some embodiments, the system 10 may include multiple inverter modules 200 that are each connected to multiple power modules 100.

The system 10 may include a controller 50 configured to control the operations of the inverter module 200 and/or the power module 100. The controller 50 may be disposed in, or operatively connected to, the inverter module 200 or the power module 100. The controller 50 may include a central processing unit and/or a memory configured to store operating software. In some embodiments, the controller 50 may provide an interface to allow an operator to control the system 10.

The inverter module 200 may include a steady-state transformer 202 and a startup transformer 204 that are connected to an external power source, such as an electrical utility 201 (e.g., power grid or external power generator) by an external power source bus 226. The steady-state transformer 202 may be connected to an AC/DC inverter 212. The inverter 212 may be connected to a steady-state diode 210 that is connected to a first balance-of-plant load BOP1. The startup transformer 204 may be connected to a rectifier 206. The rectifier 206 may be connected via the startup bus 222 to a startup diode 208 connected to the load BOP1.

The power module 100 may include a DC/DC converter 218, a startup diode 214, and a steady-state diode 216. The DC/DC converter 218 may be electrically connected to the inverter 212 and fuel cells 110 of the power module 100. The DC/DC converter 218 may also be connected to the steady-state diode 216. The diodes 214, 216 may be connected to a second balance-of-plant load BOP2. The startup diode 214 may also be electrically connected to the rectifier 206.

Referring to FIG. 1A, during startup of the system 10, before the fuel cells 110 reach the steady-state operating temperature (e.g., at least 750° C., such as 750° C. to 900° C. for SOFCs), the fuel cells 110 may not generate an amount of power sufficient for the BOP loads. As such, during startup, the power from the utility is provided to the loads BOP1, BOP2, via the startup bus 222. In particular, power flows via the startup bus 222 through the startup transformer 204, the rectifier 206, the startup diodes 208, 214, and then to the BOP loads BOP1, BOP2. The inverter 212, converter 218 and steady-state bus 220 are not used during system startup.

Referring to FIG. 1B, once the fuel cells reach the desired steady-state operating temperature (e.g., 750° C. and above), steady-state operation of the system 10 begins and power is provided from the fuel cells 110 to the loads BOP1, BOP2. In particular, power flows from the fuel cells 110 via the steady-state bus 220 through the DC/DC converter 218, the inverter 212, and through the steady-state transformer 202 to the utility and/or to any local load. Power is also diverted to loads BOP1, BOP2 as needed through the steady-state diodes 210, 216. As such, the rectifier 206 and startup transformer 204 are not used. Steady-state mode operation continues at all times when the fuel cells 110 are hot enough to generate power, which accounts for almost all of the fuel cell's operational life. This includes periods when the transformers 202, 204 are disconnected from the utility 201 (e.g., power grid) during which the steady-state transformer 202 provides power from the fuel cells 110 to a local load instead of to the power grid.

Accordingly, the transformer 204, rectifier 206, fuses (not shown), and wiring used for power conversion during startup are not used during steady-state operation, which represents most of the life cycle of the system 10. As such, this architecture increases the cost of the system 10 and decreases the energy density of the system 10. The rectifier 206 may also produce harmonic currents during startup.

Figure 2:
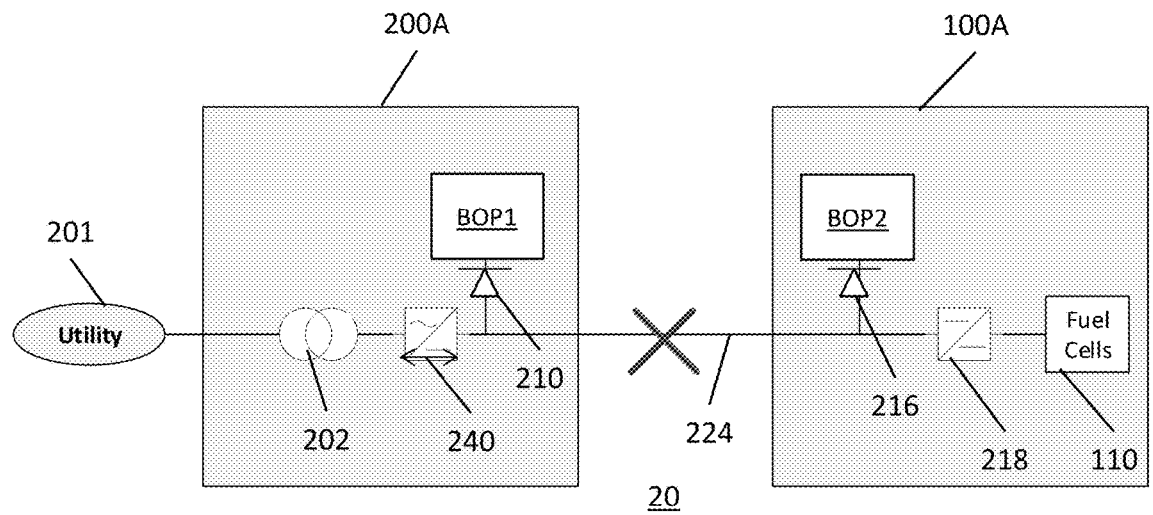
FIG. 2 is a schematic illustrating electrical architecture of a fuel cell system, according to another comparative embodiment of the present disclosure.

FIG. 2 is a schematic illustrating electrical architecture of a fuel cell system 20 according to another comparative embodiment of the present disclosure. The electrical architecture of the system 20 is similar to the electrical architecture of the system 10 shown in FIGS. 1A and B, so only differences therebetween will be discussed in detail.

Referring to FIG. 2, the system 20 includes a power module 100A and an inverter module 200A electrically connected by a combination bus 224. The inverter module 200A includes a bidirectional inverter 240 that is electrically connected to the combination bus 224. The bidirectional inverter 240 can convert AC power provided from a utility into DC power suitable for driving the loads BOP1, BOP2 during system startup, and can convert DC power from the fuel cells 110 into AC power that may be provided to the utility during steady-state operation. In other words, the combination bus 224 can be used to transmit power during both steady-state and startup operation. As such, the startup bus 222, the startup transformer 204, the rectifier 206, and the startup diodes 208, 214, of the system 10 of FIGS. 1A and 1B may be omitted from the system 20, without loss of functionality during startup.

However, a fault on the combination bus 224, as shown by the "X" in FIG. 2, may prevent power from being supplied to the BOP loads of the power module 100A, since there is no alternative power source. This may result in forced shutdown of the fuel cells 110, during which the temperature of the fuel cells 110 may drop below operating temperature, before the system 20 is restarted and the fuel cells 110 return to operating temperature. In other words, the forced shutdown may result in thermal cycling of the fuel cells 110, which may be may be detrimental to the long-term health of the fuel cells 110. Such thermal cycling may require early fuel cell replacement in order to maintain a desired power output.

Figure 3A:
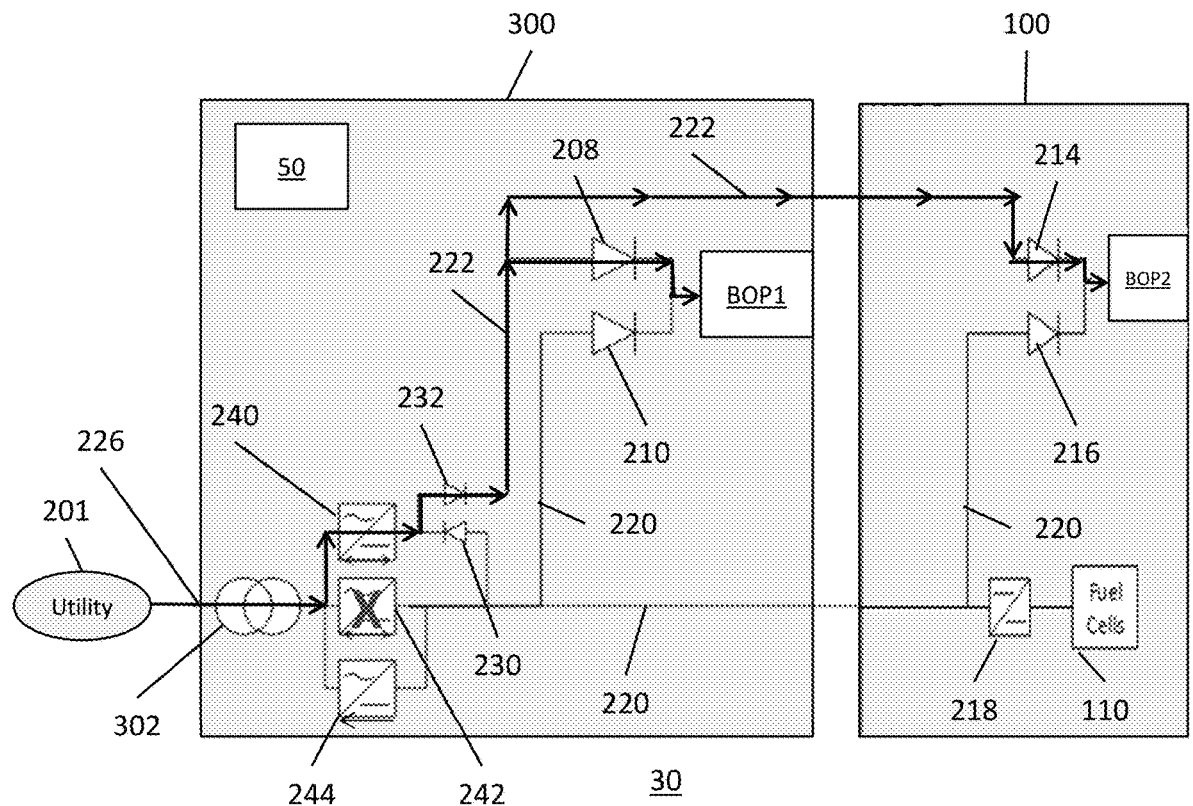
FIGS. 3A and 3B are schematics illustrating power flow through electrical architecture of a fuel cell system during startup.

FIG. 3A is a schematic illustrating power flow through electrical architecture of a fuel cell system 30 during startup, according to various embodiments of the present disclosure. The electrical architecture of the system 30 is similar to the electrical architecture of the system 10 shown in FIGS. 1A and 1B, so only differences therebetween will be discussed in detail. Referring to FIG. 3A, the system 30 includes the power module 100 and an inverter module 300, which are electrically connected by the steady-state bus 220 and the startup bus 222. While one power module 100 is shown, the system 30 may include multiple power modules 100 electrically connected to the inverter module 300. The system 30 may also include a controller 50 configured to control steady-state and startup operations of the system 30.

The inverter module 300 may include a first bidirectional inverter 240, a second bidirectional inverter 242, and at least one mono-directional third inverter 244 (e.g., one to ten mono-directional inverters), which may be electrically connected to a power utility (e.g., a power source external to the system 30) and the system transformer 302 by the external power source bus 226. The inverter module 300 contains a single system transformer 302 which operates in both startup and steady-state modes, instead of the two transformers 202, 204 shown in FIGS. 1A and 1B. The inverter module 300 may also include a startup diode 208 and a steady-state diode 210, which are electrically connected to a first balance-ofplant load BOP1. The inverter module 300 may also include a fault diode 230 and an optional auxiliary diode 232.

The power module 100 may include the startup diode 214 that is electrically connected to the startup bus 222, and the steady-state diode 216 that is electrically connected to the steady-state bus 220. Both diodes 214, 216 control current flow to the second load BOP2.

During startup mode, as shown by the arrows in FIG. 3A, the external power source bus 226 may provide power from the utility 201 sequentially to the system transformer 302 and the first inverter 240. The transformer 302 may operate to change the voltage of the utility power, and the first inverter 240 may operate to convert the AC utility power (i.e., alternating current) into a DC power (i.e., direct current). The startup bus 222 may then provide the utility power to the first load BOP1, via the startup diode 208. According, the first inverter 240 may operate as a rectifier and the separate rectifier 206 and the startup transformer 204 shown in FIG. 1A may be omitted to decrease the cost of the system 30. Thus, the system 30 may exclude any additional transformers (other than the single system transformer 302) and any rectifiers. The startup bus 222 may also provide the utility 201 power to the second load BOP2 via the startup diode 214. The fault diode 230 prevents current from flowing into through the steady-state bus 220 into the fuel cells 110 during the start-up mode. The second inverter 242 may remain off, such that power does not pass through the second inverter 242 to the steady-state bus 220. Further, since the third inverter 244 is unidirectional, the third inverter 244 may also prevent power from being supplied to the steady-state bus 220, during startup. Accordingly, during system startup, the inverter module 300 may be configured to supply utility power to both loads BOP1, BOP2 via the startup bus 222.

Figure 3B:
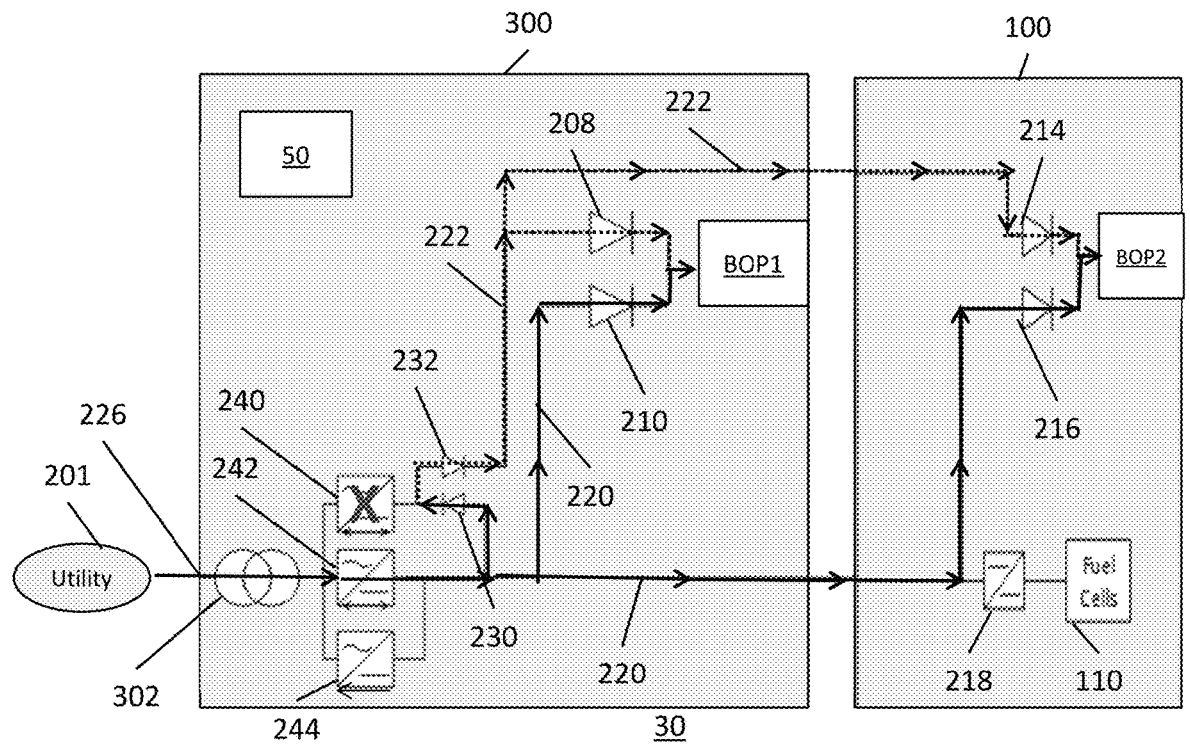

FIG. 3B is a schematic illustrating power flow through the electrical architecture of the fuel cell system 30 during a faulted startup, according to various embodiments of the present disclosure. Referring to FIG. 3B, if the first inverter 240 experiences a fault during system startup mode, the second inverter 242 is turned on and the first inverter 240 is turned off. As such, power from the utility flows from the transformer 302 to the second inverter 242, and is then provided to the loads BOP1, BOP2 via the steady-state bus 220, as shown by the solid arrows. During this time, the DC/DC converter 218 may be turned off to prevent utility 201 power from reaching the fuel cells 110. Power may also be provided from the steady-state bus 220 to the loads BOP1, BOP2, via the startup bus 222, as indicated by the dashed arrows. Accordingly, if a fault occurs on one of the busses 220, 222, then power can still be provided to the loads BOP1, BOP2, via a non-faulted another one of the buses 220, 222.

Figure 3C:
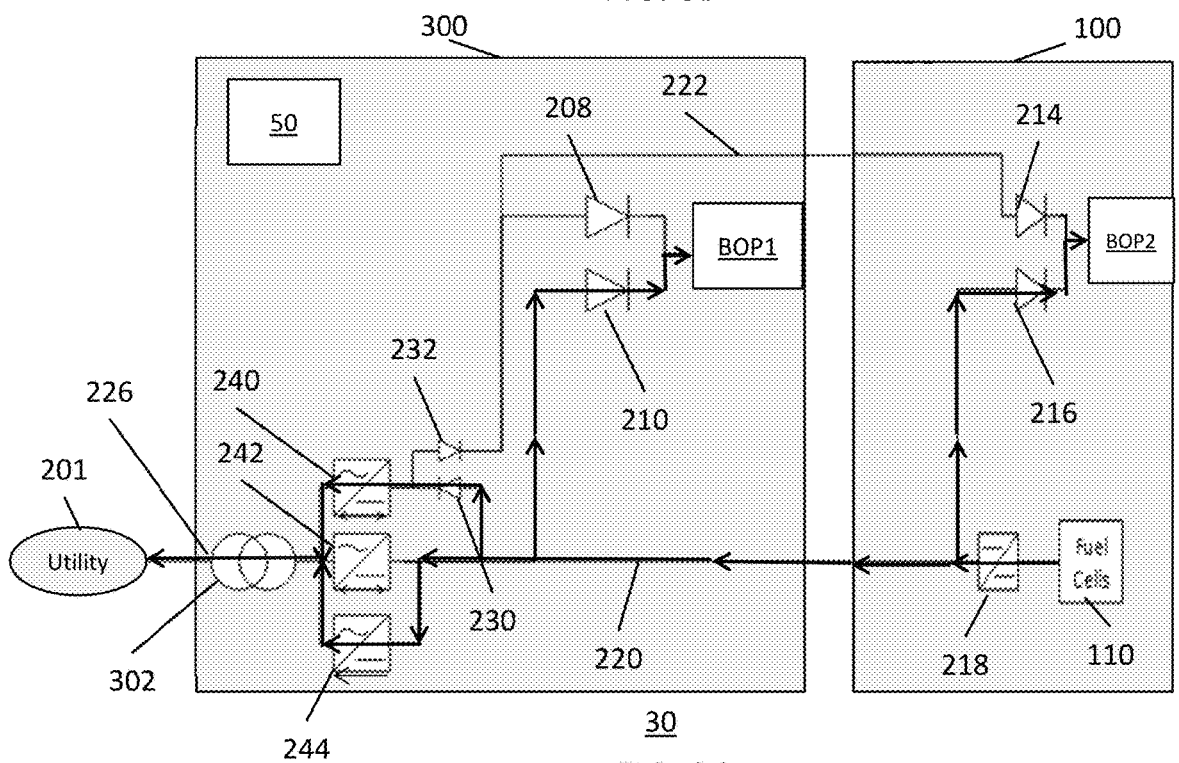
FIG. 3C is a schematic illustrating power flow through electrical architecture during steady state-operations, according to various embodiments of the present disclosure.

FIG. 3C a schematic illustrating power flow through the electrical architecture of the fuel cell system 30 during steady-state mode operation, according to various embodiments of the present disclosure. Referring to FIG. 3C, during steady-state operation, DC power (i.e., direct current) is provided from the fuel cells 110 to the DC/DC converter 218 which is turned on for voltage conversion, before being provided to the loads BOP1, BOP2 via the steady-state bus 220 through the diodes 210 and 216, respectively, as shown by the arrows. The steady-state bus 220 also provides power to the utility 201, via the first and third inverters 240, 244 and optionally via the second inverter 242. Thus, all inverters 240, 242, 244 may be turned on during the steady-state mode or only the first and the third inverters 240, 244 may be turned on and the second inverter 242 may be turned off during the stead-state mode. If the second inverter 242 is turned off, then the fault diode 230 prevents the power from the utility 201 from flowing backwards into the steady-state bus 220 during the steady-state mode if there is a fault on the steady-state bus 220 and/or if the fuel cells 110 produce no power or insufficient power.

From a control perspective, the first inverter 240 exports the same power from the steady-state bus 220 as the third inverter 244, when the voltage provided to the steady-state bus 220 by the fuel cells 110 is equal to or greater than a voltage required by the loads BOP1, BOP2. If the voltage provided by the fuel cells 110 is less than the voltage required by one or both of the loads BOP1, BOP2, then the first inverter 240 imports power from the utility 201 to the load BOP1 via the startup bus 222 and optionally to the load BOP2 via the startup bus 222. Alternatively, if the fuel cells provide sufficient power for the load BOP2, then the fuel cells 110 provide power to the load BOP2 via the steady state bus 220 and diode 216, while the utility 201 provides power to the load BOP1 via the startup bus 222 and diode 208. In both of these scenarios, the first inverter 240 ignores the command from the controller 50 to export power from the fuel cells 110 to the utility 201. In this case, if the second inverter 242 is turned off, then the fault diode 230 prevents the utility 201 power from being provided from the first inverter 240 to the steady-state bus 220.

Figure 4A:
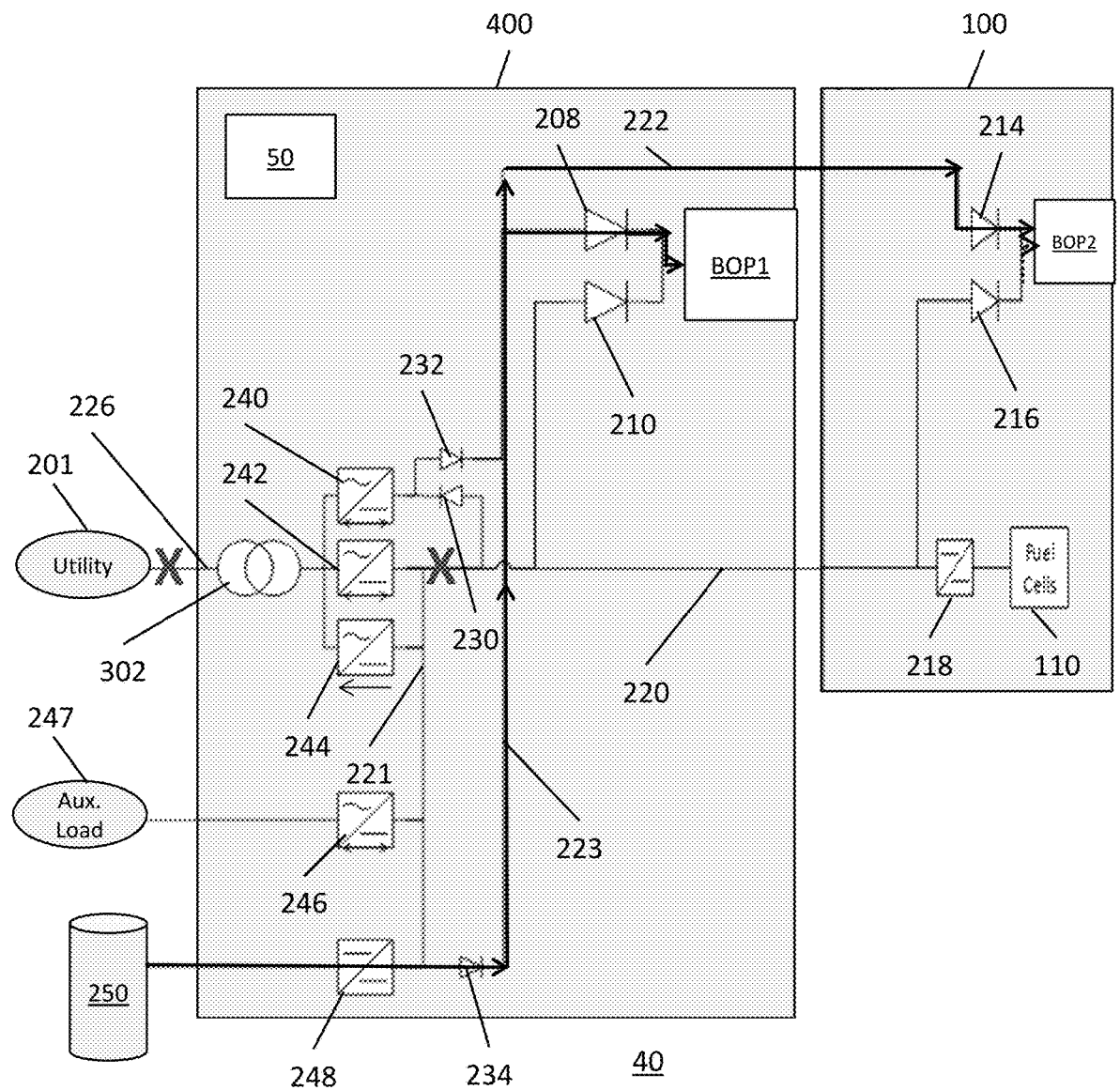
FIG. 4A is a schematic illustrating power flow through electrical architecture of a fuel cell system during startup.

FIG. 4A is a schematic illustrating power flow through electrical architecture of a fuel cell system 40 during startup, according to various embodiments of the present disclosure. The electrical architecture of the system 40 is similar to the electrical architecture of the system 40 shown in FIGS. 3A-3C, so only differences therebetween will be discussed in detail.

Referring to FIG. 4A, the system 40 includes the power module 100 and an inverter module 400, which are electrically connected by the steady-state bus 220 and the startup bus 222. The inverter module 400 includes the components of the inverter module 300. In addition, the inverter module 400 may include an auxiliary power converter 246, a DC/DC converter 248, a charging diode 234, an auxiliary steady-state bus 221, and an auxiliary startup bus 223. The system 40 may also include a controller 50 configured to control steady-state and startup operations of the system 40.

The auxiliary steady-state bus 221 may electrically connect the steady-state bus 220 to an auxiliary load 247. The auxiliary steady-state bus 221 may also be connected to the auxiliary startup bus 223 via the charging diode 234. The auxiliary startup bus 223 may electrically connect the startup bus 222 to a power storage device 250, such as a battery or supercapacitor. Depending on the power requirements of the auxiliary load 247, the auxiliary power converter 246 may be a DC/AC inverter or a DC/DC converter. For example, as shown in FIG. 4A, the auxiliary power converter 246 may be a DC/AC inverter configured to provide AC power (i.e., alternating current) to the auxiliary load 247. In other embodiments, the auxiliary power converter 246 may be a DC/DC converter configured to provide DC power to the auxiliary load 247. The DC/DC converter 248 may be configured to convert a voltage received from the energy storage device 250 into a voltage suitable for powering the loads BOP1, BOP1, and may be configured to convert a voltage received form the auxiliary steady-state bus 221 into a voltage suitable for storage in the energy storage device 250.

During startup mode, the system 40 may utilize the utility 201 power to power the loads BOP1, BOP2, as discussed above with regard to FIGS. 3A and 3B. Alternatively, the system 40 may be configured to utilize power stored in the energy storage device 250 during the startup mode. For example, as shown in FIG. 4A, the system 40 may be configured such that during the startup mode, power from the energy storage device 250 may be provided to the loads BOP1, BOP2, via the auxiliary startup bus 223 and startup bus 222, as shown by the solid arrows. Accordingly, the system 40 may be started when external power, such as power from the utility 201, is not available and/or there is a fault on bus 226. In some embodiments, power from the energy storage device 250 may optionally be provided to the auxiliary load 247 via the auxiliary steady-state bus 221 during startup and/or steady-state mode operations.

The auxiliary diode 232 may operate to prevent the power provided by the energy storage device 250 to the startup bus 222 via the auxiliary startup bus 223 from reaching the first inverter 240, such as during startup operations. The charging diode 234 may operate to prevent power provided from the utility 201 to the startup bus 222 from flowing into energy storage device 250 instead of into the loads BOP1, BOP2 during the startup mode.

Figure 4B:
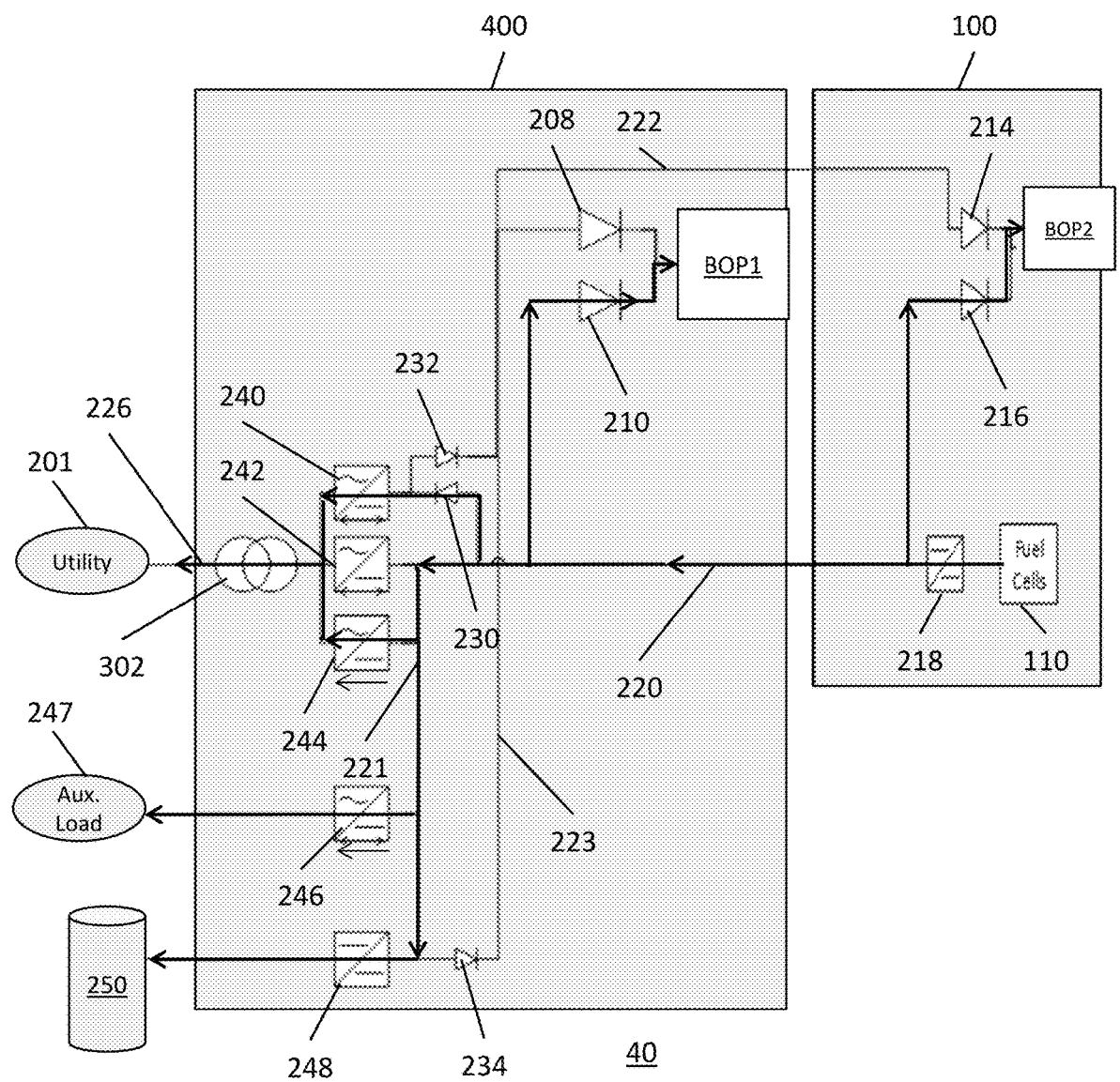
FIG. 4B is a schematic illustrating power flow through the electrical architecture of FIG. 4A during steady state-operation.

FIG. 4B is a schematic illustrating power flow through electrical architecture of the fuel cell system 40 during the steady-state mode according to various embodiments of the present disclosure. Referring to FIG. 4B, during steady-state mode operations, power may be provided from the fuel cells 110 via the steady-state bus 220 to the loads BOP1, BOP2 and the utility 201, as shown by the solid arrows. Power may also be provided from the fuel cells 110 via the steady-state bus 220 and the auxiliary steady-state bus 221 to be stored in the energy storage device 250 and/or to the auxiliary load 247.

In some embodiments, if a fault occurs in one of the inverters 240, 242, 244, during steady-state mode operation such that some or all system power from the fuel cells 110 does not reach the utility 201, then system 40 may be configured to stabilize the steady-state bus 220 by the controller 50 turning on the auxiliary inverter 246 to provide system power generated by the fuel cells 110 to the auxiliary load 247 via the steady-state bus 220 and auxiliary steady-state bus 221.

Figure 4C:
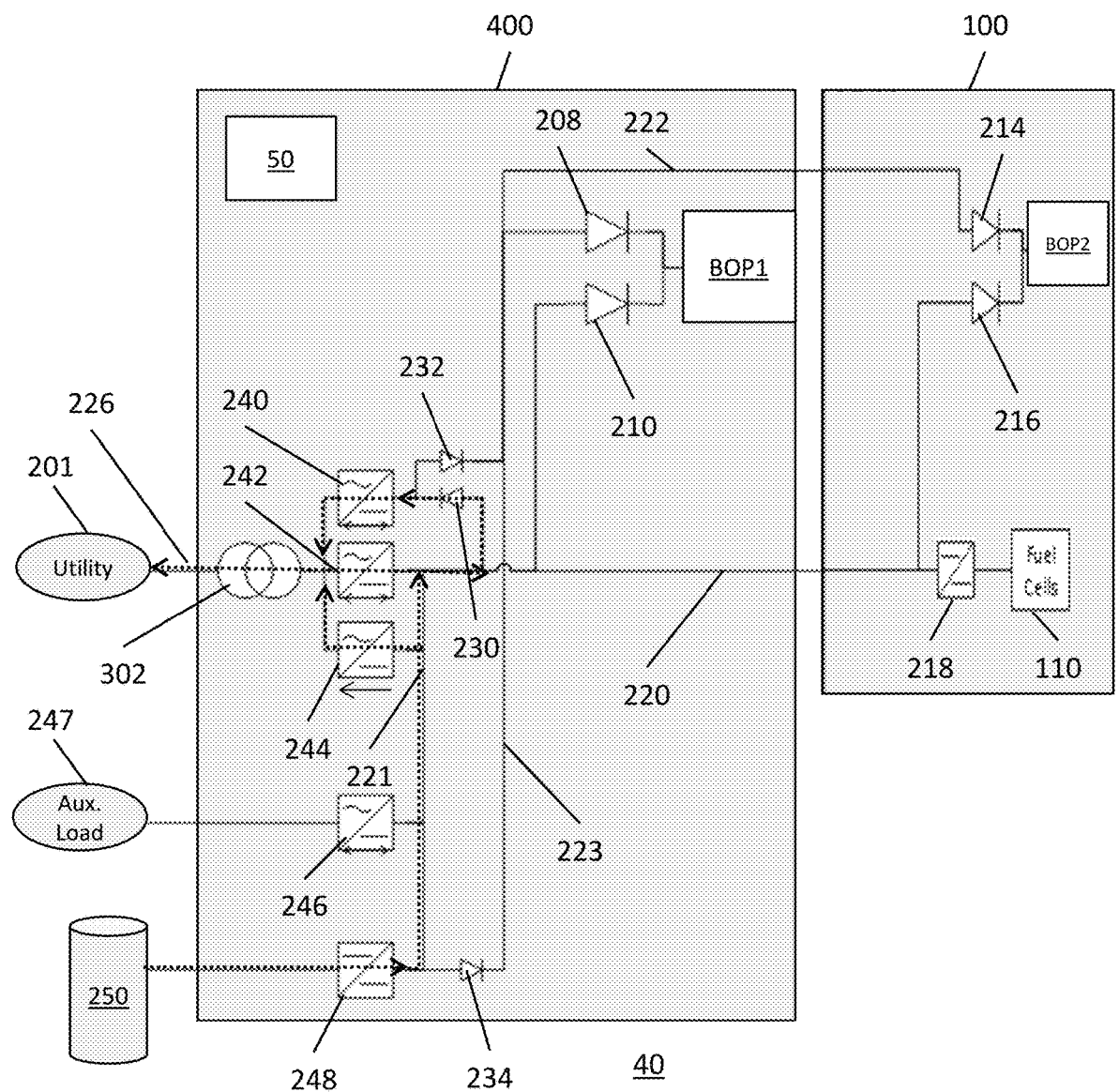
FIG. 4C is a schematic illustrating power flow through electrical architecture of FIG. 4A during testing of system components, according to various embodiments of the present disclosure.

FIG. 4C is a schematic illustrating power flow through electrical architecture of the fuel cell system 40, during testing of system components, according to various embodiments of the present disclosure. Referring to FIG. 4C, during pre-paralleling inspection (PPI) testing, power from the energy storage device 250 may be provided to components such as the inverters 240, 242, 244, via the auxiliary steady-state bus 221 as shown by the arrows in FIG. 4C. During the testing, each of the inverters 240, 242, 244 may be individually turned on and tested. As such, a separate power generator is not required to test system components. In other embodiments, other system components may be tested using the power provided by the energy storage device 250.

In other embodiments, during steady-state operations, power from the energy storage device 250 may be provided to the utility 201 through the auxiliary steady state bus 221 and the power source bus 226, via any of the inverters 240, 242, 244. The power from the energy storage device 250 may supplement the power provided by the fuel cells 110.

Thus, the system 40 simplifies the pre-paralleling inspection testing. The system 40 includes a bidirectional inverter 240, 242 that can operate as AC/DC inverter that maintains the voltage from the steady-state bus 220, while the other inverters 240, 242, 244 are subjected to on-site anti-islanding testing during the PPI procedure. As such, the use of a roll up generator, bulky PPI rig, and extensive wiring that is conventional required to perform the same testing may be eliminated.

According to one embodiment, a method of operating a fuel cell system 30 or 40 includes, during the steady-state mode operation of the system, generating system power by fuel cells 110 and providing the system power via a steady-state bus 220 to a first balance of plant (BOP) load BOP1, to a second BOP load BOP2, and to a utility power grid 201 via a transformer 302 and via at least one of a bi-directional first inverter 240 or a bi-directional second inverter 242. During the startup mode operation of the system, the method includes providing external power from the utility power grid 201 via the transformer 302, via one of the first 240 or second 242 inverters and via a startup bus 222 to the first BOP load and the second BOP load.

In one embodiment, a fault diode 230 is electrically connected between the first inverter 240 and the steady-state bus 220. The fault diode 230 prevents the external power from being provided to the steady-state bus 220 from the startup bus 222 and from the first inverter 240, and the fault diode allows the system power to flow during the steady-state mode from the fuel cells 110 through the steady-state bus 220 to the first inverter 240.

In one embodiment, the method further comprises turning off the first inverter 240 and turning on the second inverter 242 when the startup bus 222 is faulted in the startup mode, and turning on the first inverter 240 and turning off the second inverter 242 when the steady-state bus 220 is faulted in the steady-state mode.

When the first inverter is turned on and the second inverter is turned off, then during the startup mode, the first inverter 240 converts the external power received from the transformer 302 into direct current (DC) power that is provided via the startup bus to the first BOP load and the second BOP load. During the steady-state mode when the steady-state bus is not faulted, the first inverter 240 converts the system power received from the steady-state bus 220 into alternating current (AC) power that is provided to the transformer 302. During the steady-state mode when the steady-state bus 220 is faulted, the first inverter 240 converts the external power received from the transformer 302 into direct current (DC) power that is provided via the startup bus 222 to the first BOP load and the second BOP load.

Alternatively, when the second inverter is turned on and the first inverter is turned off, then during the startup mode when the startup bus 222 is faulted, the second inverter 242 converts the external power received from the transformer 302 into direct current (DC) power that is provided via the steady-state bus 220 to the first BOP load and the second BOP load. During the steady-state mode, the second inverter 242 converts the system power received from the steady-state bus 220 into alternating current (AC) power that is provided to the transformer 302.

In one embodiment, a first startup diode 208 allows power to flow through the startup bus 222 in a first direction to the first BOP load, and prevents power from flowing through the startup bus in an opposite second direction, and a second startup diode 214 allows power to flow through the startup bus 222 in the first direction to the second BOP load, and prevents power from flowing through the startup bus in the opposite second direction. A first steady-state diode 210 allows power to flow through the steady-state bus 220 in a first direction to the first BOP load, and prevents power from flowing through the steady-state bus in an opposite second direction, and a second steady-state diode 216 allows power to flow through the steady-state bus 220 in the first direction to the second BOP load, and prevents power from flowing through the steady-state bus in the opposite second direction.

In one embodiment, at least one mono-directional third inverter 244 is electrically connected to the transformer 302 and the steady-state bus 220. The at least one third inverter 244 converts direct current (DC) system power received from the steady-state bus 220 into alternating current (AC) power, and provides the AC power to the transformer 320, and the system power passes in the steady-state mode through at least either of the first inverter 240 or the at least one third inverter 244 before being provided to the transformer 302.

In one embodiment, an energy storage device 250 stores the system power. An auxiliary steady-state bus 221 electrically connects the energy storage device 250 to the steady-state bus 220, and an auxiliary startup bus 223 electrically connects the energy storage device to the startup bus 220. The energy storage device 250 provides the system power to the first BOP load and the second BOP load via the auxiliary startup bus 223 and the startup bus 220 when the external power from the utility power grid 201 is not available. A charging diode 234 disposed on the auxiliary startup bus 223 which prevents power from flowing into the energy storage device 250 from the auxiliary startup bus. A DC/DC converter 248 changes a voltage of power received from the energy storage device 250 and provided to the auxiliary startup bus 223, and which changes a voltage of power received from the auxiliary steady-state bus 221 and provided to the energy storage device 250.

An auxiliary load 247 may also be provided. A bi-directional fourth (i.e., auxiliary) AC/DC inverter 246 is electrically connected to the auxiliary steady-state bus 221 and to the auxiliary load 247. The fourth AC/DC inverter 246 stabilizes the steady-state bus 220 by providing power to the auxiliary load 247 from the steady-state bus 220 when a fault occurs in at least one of the first inverter 240, the second inverter 242, or the at least one third inverter 244 during the steady-state mode. In one embodiment, at least one of the first 240 and second 242 inverters rectify the external power during the startup mode, and invert the system power during the steady-state mode.

Accordingly, the electrical architecture provided by various embodiments of the present disclosure may eliminate the need for a separate startup rectifier and transformer by providing the same degree of functionality by utilizing bidirectional inverters. As such, components such as startup transformers and rectifiers, which are infrequently utilized, may be eliminated from a fuel cell system. In addition, this architecture may also be used to store energy, in order to keep the fuel cell BOP components powered in case of a fault, which allows the fuel cells to remain at operating temperatures, thereby reducing or preventing cycle life reduction due to thermal cycling events.

The electrical architecture may be simplified, as compared to conventional architecture, without sacrificing reliability. This allows for cost reduction and more efficient space utilization. In addition, the electrical architecture allows for system startup without utilizing utility power, provides improved module functionality, and provides greater flexibility to installation and field service teams to meet operational goals.

The controller 50 may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions. The processor may include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The construction and arrangements as shown in the various examples are illustrative only. Although only a few examples have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative examples. Other substitutions, modifications, changes, and omissions may also be made in the design, operating conditions and arrangement of the various examples without departing from the scope of the present disclosure. Any one or more features of any example may be used in any combination with any one or more other features of one or more other examples. It is intended that the specification and examples be considered as exemplary only, with a true scope being indicated by the following claims and their equivalents.

What is claimed is:

1. A fuel cell system, comprising:
   an inverter module comprising:
      a transformer electrically connected to an external power source bus which is configured to be connected to an external power source;
      bidirectional first and second inverters electrically connected to the transformer;
      a fault diode electrically connected to the first inverter; and
      a first balance of plant (BOP) load;
   a power module comprising:
      fuel cells; and
      a second BOP load;
   a steady-state bus electrically connecting the first and second inverters to the first BOP load, the second BOP load, and the fuel cells; and a startup bus electrically connecting the first and second inverters to the first BOP load and the second BOP load, wherein:

during steady-state mode operation of the system, system power is generated by the fuel cells and is provided to the first BOP load, the second BOP load, and at least one of the first inverter and the second inverter, via the steady-state bus, and during startup mode operation of the system, external power from the external power source bus is provided to the first BOP load and the second BOP load, via one of the first or second inverters and via the startup bus.

2. The system of claim 1, wherein:

the fault diode is electrically connected between the first inverter and the steady-state bus;

the fault diode is configured to prevent the external power from being provided to the steady-state bus from the startup bus and from the first inverter; and the fault diode is configured to allow the system power to flow during the steady-state mode from the fuel cells through the steady-state bus to the first inverter.

3. The system of claim 1, further comprising a system controller configured to turn off the first inverter and turn on the second inverter when the startup bus is faulted in the startup mode, and configured to turn on the first inverter and turn off the second inverter when the steady-state bus is faulted in the steady-state mode.

4. The system of claim 3, wherein when the first inverter is turned on and the second inverter is turned off:

during the startup mode, the first inverter is configured to convert the external power received from the transformer into direct current (DC) power that is provided via the startup bus to the first BOP load and the second BOP load;

during the steady-state mode when the steady-state bus is not faulted, the first inverter is configured to convert the system power received from the steady-state bus into alternating current (AC) power that is provided to the transformer; and during the steady-state mode when the steady-state bus is faulted, the first inverter is configured to convert the external power received from the transformer into direct current (DC) power that is provided via the startup bus to the first BOP load and the second BOP load.

5. The system of claim 3, wherein when the second inverter is turned on and the first inverter is turned off:

during the startup mode when the startup bus is faulted, the second inverter is configured to convert the external power received from the transformer into direct current (DC) power that is provided via the steady-state bus to the first BOP load and the second BOP load; and during the steady-state mode, the second inverter is configured to convert the system power received from the steady-state bus into alternating current (AC) power that is provided to the transformer.

6. The system of claim 1, further comprising:

a first startup diode configured to allow power to flow through the startup bus in a first direction to the first BOP load, and prevent power from flowing through the startup bus in an opposite second direction;

a second startup diode configured to allow power to flow through the startup bus in the first direction to the second BOP load, and prevent power from flowing through the startup bus in the opposite second direction;

a first steady-state diode configured to allow power to flow through the steady-state bus in a first direction to the first BOP load, and prevent power from flowing through the steady-state bus in an opposite second direction; and a second steady-state diode configured to allow power to flow through the steady-state bus in the first direction to the second BOP load, and prevent power from flowing through the steady-state bus in the opposite second direction.

7. The system of claim 1, further comprising at least one mono-directional third inverter electrically connected to the transformer and the steady-state bus, wherein:

the at least one third inverter is configured to convert direct current (DC) power received from the steady-state bus into alternating current (AC) power that is provided to the transformer; and the system power may pass in the steady-state mode through at least either of the first inverter or the at least one third inverter before being provided to the transformer.

8. The system of claim 1, further comprising:

an energy storage device configured to store the system power;

an auxiliary steady-state bus electrically connecting the energy storage device to the steady-state bus;

an auxiliary startup bus electrically connecting the energy storage device to the startup bus, wherein the energy storage device is configured to provide the system power to the first BOP load and the second BOP load via the auxiliary startup bus and the startup bus when the external power from the utility power grid is not available;

a charging diode disposed on the auxiliary startup bus and configured to prevent power from flowing into the energy storage device from the auxiliary startup bus; and a DC/DC converter configured to change a voltage of power received from the energy storage device and provided to the auxiliary startup bus, and to change a voltage of power received from the auxiliary steady-state bus and provided to the energy storage device.

9. The system of claim 8, further comprising an auxiliary load and a power converter comprising a DC/DC converter or a bi-directional fourth AC/DC inverter electrically connected to the auxiliary steady-state bus and to the auxiliary load, wherein the power converter is configured to stabilize the steady-state bus by providing power to the auxiliary load from the steady-state bus when a fault occurs in at least one of the first inverter, the second inverter, or the at least one third inverter during the steady-state mode of the system.

10. The system of claim 1, wherein:

at least one of the first and second inverters are configured to invert the system power provided to the transformer during the steady-state mode, and to rectify the external power provided from the transformer during the startup mode; and the system excludes any additional transformers and rectifiers.

11. A method of operating a fuel cell system, comprising:

during steady-state mode operation of the system, generating system power by fuel cells and providing the system power via a steady-state bus to a first balance of plant (BOP) load, to a second BOP load, and to a power grid via a transformer and via at least one of a bi-directional first inverter or a bi-directional second inverter; and during startup mode operation of the system, providing external power from the power grid via the transformer, via one of the first or second inverters and via a startup bus to the first BOP load and the second BOP load.

12. The method of claim 11, further comprising a fault diode which is electrically connected between the first inverter and the steady-state bus, wherein:
the fault diode prevents the external power from being provided to the steady-state bus from the startup bus and from the first inverter; and
the fault diode allows the system power to flow during the steady-state mode from the fuel cells through the steady-state bus to the first inverter.

13. The method of claim 11, further comprising:
turning off the first inverter and turning on the second inverter when the startup bus is faulted in the startup mode; and
turning on the first inverter and turning off the second inverter when the steady-state bus is faulted in the steady-state mode.

14. The method of claim 13, wherein when the first inverter is turned on and the second inverter is turned off:
during the startup mode, the first inverter converts the external power received from the transformer into direct current (DC) power that is provided via the startup bus to the first BOP load and the second BOP load;
during the steady-state mode when the steady-state bus is not faulted, the first inverter converts the system power received from the steady-state bus into alternating current (AC) power that is provided to the transformer; and
during the steady-state mode when the steady-state bus is faulted, the first inverter converts the external power received from the transformer into direct current (DC) power that is provided via the startup bus to the first BOP load and the second BOP load.

15. The method of claim 13, wherein when the second inverter is turned on and the first inverter is turned off:
during the startup mode when the startup bus is faulted, the second inverter converts the external power received from the transformer into direct current (DC) power that is provided via the steady-state bus to the first BOP load and the second BOP load; and
during the steady-state mode, the second inverter converts the system power received from the steady-state bus into alternating current (AC) power that is provided to the transformer.

16. The method of claim 11, further comprising:
a first startup diode which allows power to flow through the startup bus in a first direction to the first BOP load, and prevents power from flowing through the startup bus in an opposite second direction;
a second startup diode which allows power to flow through the startup bus in the first direction to the second BOP load, and prevents power from flowing through the startup bus in the opposite second direction;
a first steady-state diode which allows power to flow through the steady-state bus in a first direction to the first BOP load, and prevents power from flowing through the steady-state bus in an opposite second direction; and
a second steady-state diode which allows power to flow through the steady-state bus in the first direction to the second BOP load, and prevents power from flowing through the steady-state bus in the opposite second direction.

17. The method of claim 11, further comprising at least one mono-directional third inverter electrically connected to the transformer and the steady-state bus, wherein:
the at least one third inverter converts direct current (DC) system power received from the steady-state bus into alternating current (AC) power, and provides the AC power to the transformer; and
the system power passes in the steady-state mode through at least either of the first inverter or the at least one third inverter before being provided to the transformer.

18. The method of claim 11, further comprising:
an energy storage device which stores the system power;
an auxiliary steady-state bus electrically connecting the energy storage device to the steady-state bus;
an auxiliary startup bus electrically connecting the energy storage device to the startup bus, wherein the energy storage device provides the system power to the first BOP load and the second BOP load via the auxiliary startup bus and the startup bus when the external power from the utility power grid is not available;
a charging diode disposed on the auxiliary startup bus which prevents power from flowing into the energy storage device from the auxiliary startup bus; and
a DC/DC converter which changes a voltage of power received from the energy storage device and provided to the auxiliary startup bus, and which changes a voltage of power received from the auxiliary steady-state bus and provided to the energy storage device.

19. The method of claim 18, further comprising an auxiliary load and a power converter comprising a DC/DC converter or a bi-directional fourth AC/DC inverter electrically connected to the auxiliary steady-state bus and to the auxiliary load, wherein the power converter stabilizes the steady-state bus by providing power to the auxiliary load from the steady-state bus when a fault occurs in at least one of the first inverter, the second inverter, or the at least one third inverter during the steady-state mode.

20. The method of claim 11, wherein at least one of the first and second inverters rectify the external power during the startup mode, and invert the system power during the steady-state mode.

* * * * *